April 29, 1924.
J. W. WHITE
DEMOUNTABLE RIM
Filed Dec. 21, 1922
1,492,500
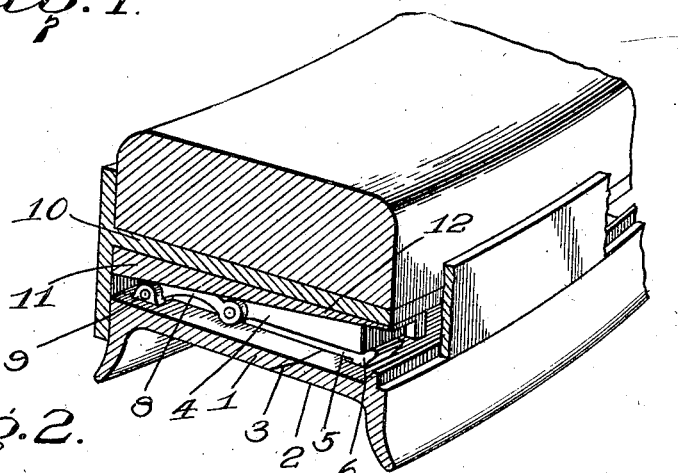
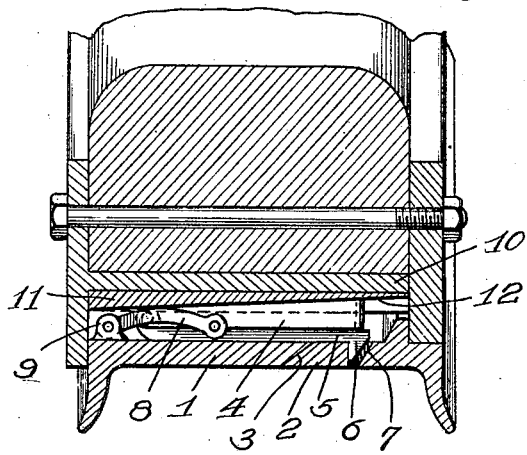
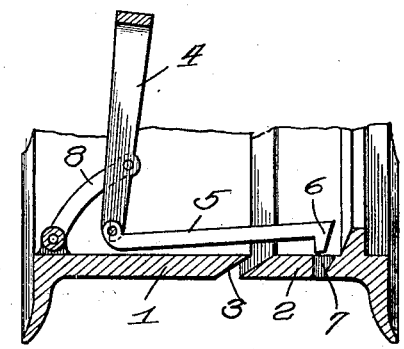
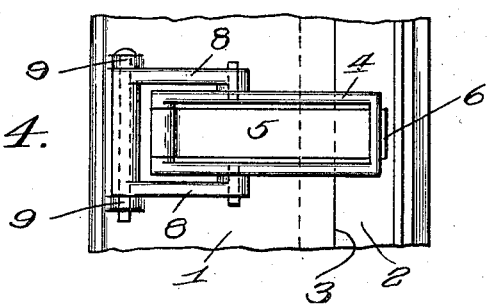
Inventor
J. W. White
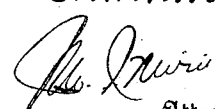
Attorney Patented Apr. 29, 1924.

1,492,500

UNITED STATES PATENT OFFICE.

JOHN WESLEY WHITE, OF LEWISTOWN, MONTANA.

DEMOUNTABLE RIM.

Application filed December 21, 1922. Serial No. 608,337.

*To all whom it may concern:*

Be it known that I, JOHN WESLEY WHITE, a citizen of the United States of America, residing at Lewistown, in the county of Fergus and State of Montana, have invented certain new and useful Improvements in Demountable Rims, of which the following is a specification.

This invention relates to an improvement in demountable rims, and particularly to a means for securing the parts of a sectional rim together to insure their remaining in fixed relation, the securing means also serving as a means for wedging the rim with relation to the wheel.

The demountable rim of the present improvement is divided circumferentially into two sections, to materially facilitate the application and removal of the tire, and these sections are respectively provided with cooperating elements adapted through easy and convenient manipulation to lock the rim sections in rigid relation, or to permit their ready separation as desired. The securing means or more particularly one element thereof, is adapted to cooperate with means arranged on the wheel rim to substantially wedge the demountable rim in place on the wheel rim when the parts are in final positions.

In the accompanying drawings:

Fig. 1 is a partial perspective view, showing the application of the demountable rim to a wheel.

Fig. 2 is a section transverse the wheel rim and demountable rim and showing the locking means in elevation with the parts thereof in locking relation.

Fig. 3 is a sectional view through the demountable rim, showing the locking parts in open or unlocked relation to the rim.

Fig. 4 is a plan view of a portion of the demountable rim with the locking means in position.

The improved demountable rim is made up of two sections 1 and 2, by dividing the rim circumferentially. The meeting edges of the sections may be oppositely beveled at 3, and one of the sections as 1 is preferably of greater width than the other section 2, in order that the tire may be wholly placed on the section 1 when applying the same and permitted to spread onto the section 2 after the latter has been secured in place and by means of the inflation of the tube.

The locking means here shown comprises a lever 4 wedge shaped in side elevation. A locking bar 5 is pivotally connected to the small end of the lever 4, and is provided at its free end with a hook-like projection 6, adapted to engage an opening 7 in the rim section 2. The lever 4 is pivotally supported from the rim section 1 through spaced links 8. These links are pivoted to ears 9 projecting from the section 1 and are in turn connected to the lever 4 between the ends thereof.

In the use of the demountable rim, the tire is applied to the section 1, following which the section 2 is positioned adjacent the section 1. The levers in their unlocked relation and carried wholly by the section 1, are then manipulated, so that the hook ends 6 of the locking bars 5 are engaged in the openings 7 of the rim section 2. The levers are then placed downwardly onto the rim, this action obviously drawing upon the locking rods 5 and thus causing the rim sections 2 to move into a proper and fixed position relative to the section 1 to complete the rim.

It is to be particularly noted that the connection of the locking rods 5 to the levers 4 and the connection of the links 8 to the levers 4, cause the parts when in locking relation to so offset the relative lever connections to the locking rods and links as to provide an automatic lock, requiring a positive raising of the free ends of the levers before the latter can start to move to release the pull on the locking rods 5.

As heretofore stated, the levers 4 are wedge shape in side elevation, and the wheel rim 10 is formed at determinate points with blocks 11 having wedge shaped recesses 12. These recesses 12 are of a size and so positioned as to permit of the cooperation of the wedge shaped levers therewith, so that in the application of the demountable rim, the cooperation of the wedge shaped levers and the wedge shaped recesses not only hold the rim against creeping but insure a wedging action between the demountable rim and wheel rim to aid in preventing separation of these parts. In addition to the wedge shaped parts for securing the rim in place, I provide a ring 13 secured to the outer side of the wheel by bolts 14, which rim overlies a flange 15 projecting from the outer demountable rim section 2. This ring 13 serves not only to prevent possibility of lateral displacement of the demountable rim but effectually seals the space between the demountable rim and wheel rim to prevent the entrance of dirt or water therein.

The demountable rim with the tire applied may be readily secured in position on the wheel and as readily removed, the entire operation of locking or unlocking the respective rim sections to provide for the application or removal of the tire being conveniently performed without the use of special or in fact any particular tool.

Claims:

1. A demountable rim divided circumferentially to provide sections, a plurality of securing means for the sections, each of said means including a link connected to one section, a lever pivoted intermediate its length to the link, and a locking bar connected to said lever, said locking bar having a hook terminal to engage an opening in the other section of the rim, whereby said sections are locked together by moving the free end of the lever toward the section formed with an opening, thereby confining the locking elements wholly between the edges of the rim.

2. A demountable rim divided circumferentially to provide sections, a plurality of securing means for the sections, each of said means including a link connected to one section, a lever pivoted intermediate its length to the link, and a locking bar connected to said lever, said locking bar having a hook terminal to engage an opening in the other section of the rim, whereby said sections are locked together by moving the free end of the lever toward the section formed with an opening, thereby confining the locking elements wholly between the edges of the rim, the free end of the lever bearing upon the hook end of the locking bar when the parts are in locked position.

In testimony whereof I affix my signature.

JOHN WESLEY WHITE. [L. S.]